United States Patent [19]
Green et al.

[11] Patent Number: 5,333,256
[45] Date of Patent: Jul. 26, 1994

[54] METHODS OF MONITORING THE STATUS OF AN APPLICATION PROGRAM

[75] Inventors: Emily A. Green; Jerry W. Malcolm; Ha H. Nguyen; Cynthia A. Roosken, all of Austin, Tex.

[73] Assignee: International Business Machines Corporation, Armonk, N.Y.

[21] Appl. No.: 865,788

[22] Filed: Apr. 7, 1992

Related U.S. Application Data

[63] Continuation of Ser. No. 683,127, Apr. 9, 1991, abandoned, which is a continuation of Ser. No. 352,800, May 15, 1989, abandoned.

[51] Int. Cl.$^5$ ............................................. G06F 15/62
[52] U.S. Cl. ...................................... 395/159; 395/650
[58] Field of Search .............................. 395/144–149, 395/155–161, 650

[56] References Cited

U.S. PATENT DOCUMENTS 4,829,468  5/1989  Nonaka et al. ...................... 364/900
4,858,152  8/1989  Estes ................................. 364/521 X

OTHER PUBLICATIONS

"A Graphical Language for Concurrent Programming", by Man-Chi Pong, *1986 IEEE Computer Society Workshop on Visual Languages*, pp. 26–33.

Manual for Macintosh II, Finder Reference, from Apple Computer, Inc., Cupertino, Calif. pp. 171–183, 1986.

*Microsoft Windows User's Guide*, Microsoft Corp. 1987, pp. 31–44, 64–78 and 105.

Computer, vol. 19, No. 9, Sep. 1986, pp. 57–67, New York, US; B. A. Myers: "A Complete and Efficient Implementation of Covered Windows", p. 58, right-hand column, line 25; p. 59, right-hand column, line 35.

BYTE, vol. 7, No. 4, Apr. 1982, pp. 242–282, St. Peterborough, US; D. C. Smith et al.: "Designing the Star User Interface", p. 254, right-hand column, lines 24–44; p. 256, left-hand column, line 1, middle column, line 5; FIG. 1.

Patent Abstract of Japan, vol. 11, No. 256 (P-607) [2703], Aug. 20, 1987; & JP-A-62 063 333 (NEC Corp.) Mar. 20, 1987, whole document.

Research Disclosure, Sep. 1988, p. 662, disclosure No. 29334, "Graphic Indicator for Mail Status and Type".

Research Disclosure, Feb. 1989, p. 99, disclosure No. 29824, "Dynamic Icon Content", whole document.

*Primary Examiner*—Heather R. Herndon
*Attorney, Agent, or Firm*—H. St. Julian; Douglas H. Lefeve

[57] ABSTRACT

An application or terminal emulation program, which is being executed on an information processing system, is represented by the display of a first icon on a display device. If during the execution of the application or terminal emulation program, a virtual display buffer associated with the application program, is updated, a second icon is displayed on the display device to indicate to a user of the system that a change in the status of the program has occurred.

6 Claims, 8 Drawing Sheets

METHODS OF MONITORING THE STATUS OF AN APPLICATION PROGRAM

This is a continuation of application Ser. No. 07/683,127 filed Apr. 9, 1991, now abandoned which is a continuation of application Ser. No. 07/352,800 filed May 15, 1989 now abandoned.

TECHNICAL FIELD

This invention relates to methods of executing applications on a multitasking information processing system and more particularly to methods of changing an appearance of an icon associated with an application program being executed on the information processing system to indicate a change in status of the application program.

BACKGROUND INFORMATION

In multitasking operating systems, an end user may execute several application programs simultaneously. The user interacts with only one of the application programs at a time. Windowing systems have been utilized with multitasking operating systems wherein each of the application programs is associated with a respective window and is displayed on a portion of the user's display unit. The user may size and move a selected window. Additionally, all or a portion of several windows may be visible at a given time. The user may choose to change the appearance of the application program from a window to an icon which pictorially represents the associated application program. This procedure is called "minimizing" an application. The icon generally remains visible on the display while the user operates in an active or a primary window. Moreover, the execution of the application continues even though the application program is being represented by the icon. A plurality of icons may be utilized to represent respective application programs. When a selected application program has been minimized, the application program maintains, in a virtual buffer, an internal representation of the data which would have normally appeared in the window associated therewith.

Oftentimes, the user desires to know when a selected minimized application program has completed a desired task or requires the attention of the user. In this case, the user must restore the appearance of the application to the window associated therewith. If the application has not completed the desired task or does not require attention, the user generally, minimizes the application in order to perform additional work in primary window or to check the status of another minimized application program. This process is tedious and time consuming. Moreover, the process is extremely time consuming when there are a plurality of icons representing respective application programs. In this case the user must restore and then minimize each of the applications to determine if any or all have completed their respective desired task or needs the attention of the user.

Consequently, what is needed is a method of monitoring an application whereby the user can determine the status thereof without restoring the application.

DISCLOSURE OF THE INVENTION

This invention relates to methods of monitoring the execution of an application program in an information processing system. A first icon, which is associated with the application program, is displayed on a display device included in the information processing system. A determination is made as to when a virtual display buffer, which is associated with the application program, is updated. A second icon, which is also associated with the application program, is displayed in response to the virtual display buffer being updated to indicate a change in the status of the application program.

BEST MODE FOR CARRYING OUT THE INVENTION

Figure 1:
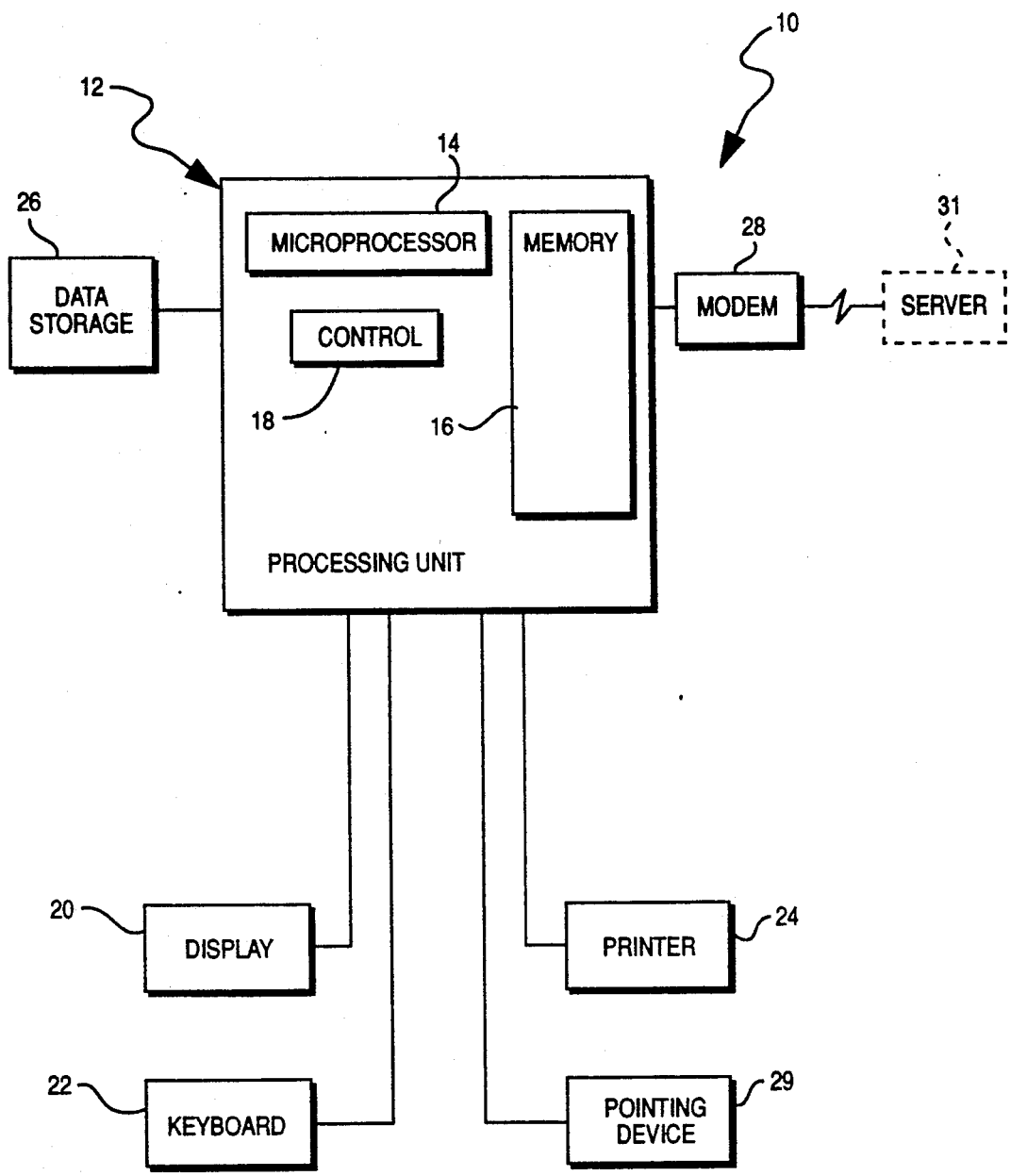
FIG. 1 is a block diagram of an information processing system on which the method of the present invention may be employed.

Referring to FIG. 1, there is shown a computer system 10 on which the present invention may be employed. System 10 includes a central processing unit 12 having a microprocessor 14, a memory system 16 and a control system 18 which functions to control input/output operations in addition to the interaction between the microprocessor and the memory system. System 10 also includes a group of conventional peripheral units including a display device 20, a keyboard 22, a printer 24, a data storage unit 26, a modem 28 and a pointing device or mouse 29. Since the details of the above described peripheral units form no part of the present invention and can be found in the prior art, only a brief functional description of each of the units will be set forth.

The central processing unit 12 corresponds to the "system unit" of a personal computer system such as an IBM XT, an IBM AT or an IBM Personal Systems/2 computer system. The central processing unit 12 is provided with a multitasking operating system program such as the IBM Operating System/2 which is normally employed to run the selected computer system. The operating system program is stored in memory system 16 or in the data storage unit 26 along with one or more application programs which the user can select to be executed on the system 10. Depending on the capacity of the memory system 16 and the size of the application programs, portions of these programs, as needed, may be transferred to the memory system 16 from the data storage unit 26 which may include, for example, a hard disk drive and a diskette drive. The basic function of the data storage unit 26 is to store programs and data which are employed by the system 10 and which may readily be transferred to the memory system 16 when needed. The function of the diskette drive is to provide a removable storage function for entering programs and data into the system, and a vehicle for storing data in a form that is readily transportable for use on other computer systems.

Display device 20 and keyboard 22 together provide for an interactive operation of the computer system 10 wherein the interpretation that the computer system gives to a specific keystroke by the user depends, in substantially all situations, on what is being displayed to the user at that point in time. Additionally, interactive operation of the computer system 10 may also be provided by the display device 20 and the pointing device 29, such as a mouse, wherein the interpretation that the computer system gives to a specific position of a cursor depends, in substantially all situations, on what is being displayed to the user at that point in time.

In certain situations, the user, by entering commands into the computer system 10, causes the system to perform a certain function. In other situations, the computer system 10 requests the entry of certain data, generally by displaying a prompt type of menu/message screen. Moreover, the computer system 10 may be controlled by positioning the cursor coincident with a selected item on the menu/screen or a control area associated with a primary window being displayed on the display device 20. The depth of the interaction between the user and the computer system 10 varies by the type of operating system and the application program, but is a necessary characteristic of the computer systems on which the method of the present invention may be employed.

As noted above, computer system 10 includes the printer 24 which functions to provide a hard copy output of data developed or stored in the computer system. The modem 28 functions to transfer data from the computer system 10 to a host computer or server system 31 through one or more communication links which may be a commercial type link or a dedicated communications link.

Figure 2:
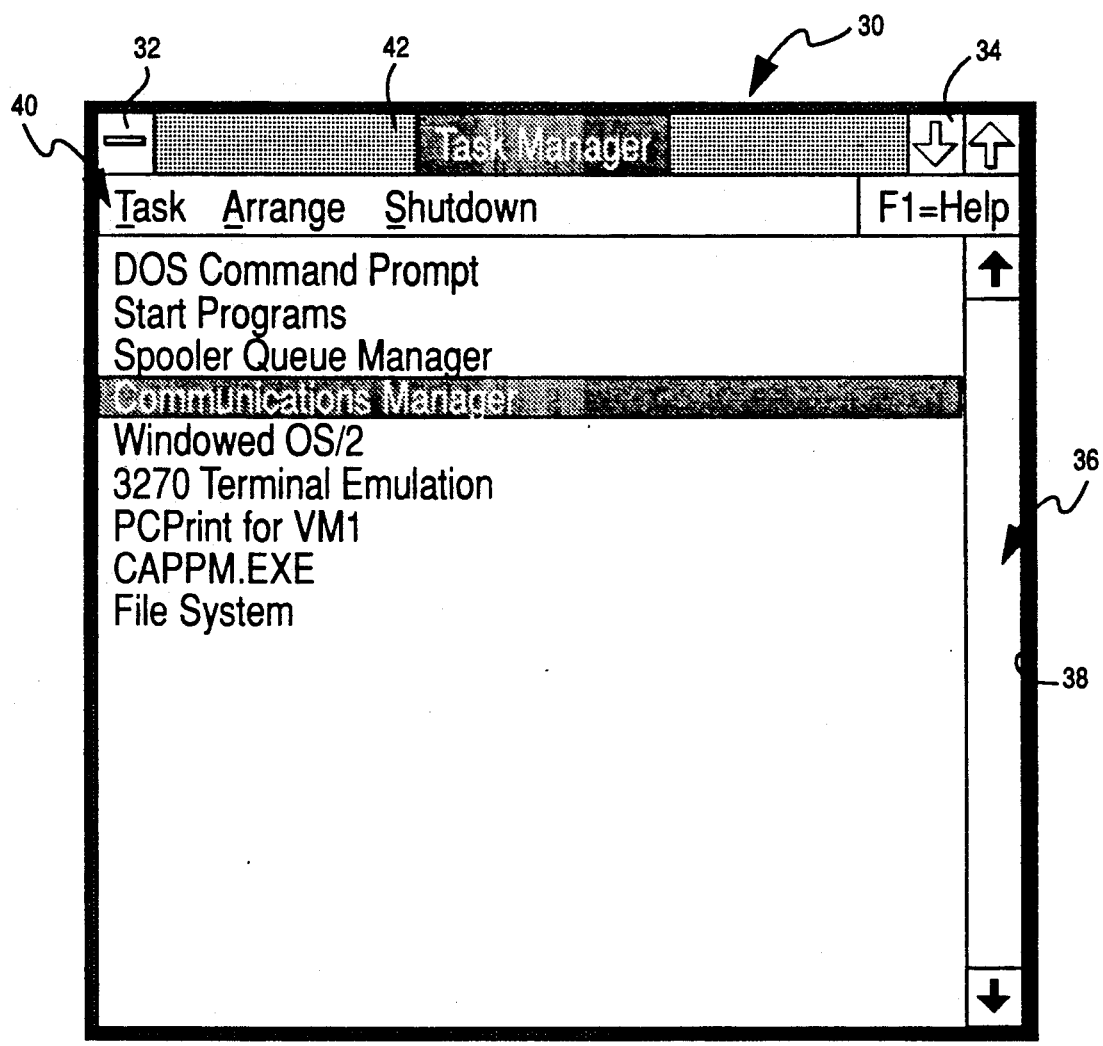
FIG. 2 shows a single window which is associated with an application.

Referring to FIG. 2, there is shown an application window 30 which is displayed on a screen of the display unit 20. The application window 30 includes a plurality of control areas 32, 34 and 36 arranged about the periphery thereof representing functions which are available for selection by the user. The control area 32 facilitates the display of a system menu within the window 30 for presenting several additional functions to a user of the system 10. Control area 34 facilitates the minimization of the application window 30. When the application window 30 is minimized, the entire appearance of the window is replaced by an icon associated therewith. Control area 36 facilitates the scrolling of information associated with an application program within the application window 30. Control area 38 represents a sizing border of the application window 30. When the cursor is positioned coincident with the sizing border and a button on the mouse 29 is depressed, the size of the window 30 may be made larger or smaller. In response to changing the size of the application window 30, other application windows, which may be displayed on the screen of the display device 20, may be obscured or made visible.

The application window 30 also includes a line 40 having a plurality of commands thereon. A selected one of the commands may be selected by positioning the cursor coincident with one of a desired command and depressing a button on the pointing device or mouse 29. Alternately, the desired command may be selected by entering a first letter of the desired command utilizing the keyboard 22. The application window 30 further includes a title bar 42 which is associated with an application program or terminal emulator. When the cursor is positioned coincident with the title bar 42 and a button on the mouse 29 is depressed, the window 30 may be moved to a different position on the screen of the display device 20.

Figure 3:
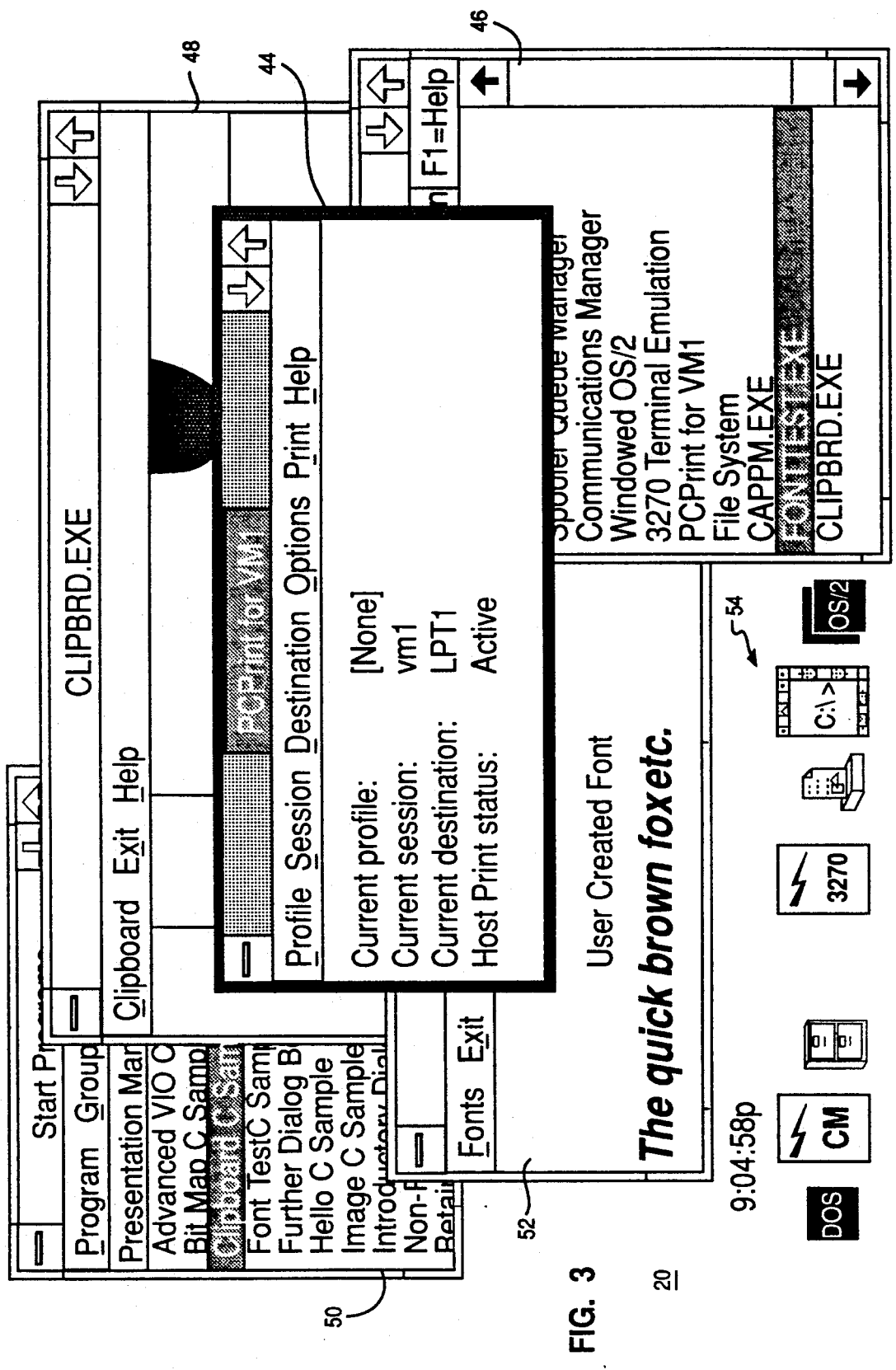
FIG. 3 shows a plurality of windows each of which is associated with a respective application.

Referring to FIG. 3, there is shown a plurality of application windows 44, 46, 48, 50 and 52 being displayed on the screen of the display device 20. Each of the application windows 44, 46, 48, 50 and 52 includes control areas which are similar to those included in the application window 30. Moreover, each of the application windows 44, 46, 48, 50 and 52 are associated with a respective application program or terminal emulator. As viewed in FIG. 3, application window 44 overlays application windows 46 and obscures a portion thereof. Application window 44 is a top-most window and, thus, is the primary or active window. The primary or active window is the only window with which the user may interact. Thus, if the user desires to interact with a window other than application window 44, each of the windows which overlay the desired window must be removed and/or minimized. A plurality of icons 54, which are displayed along a border of the screen of the display device 20, represent minimized application windows. Irrespective of whether an application program or terminal emulator is associated with an application window or with an icon, execution of the application program continues until a desired task associated therewith is completed or the application program requires the attention of the user.

Figure 4:
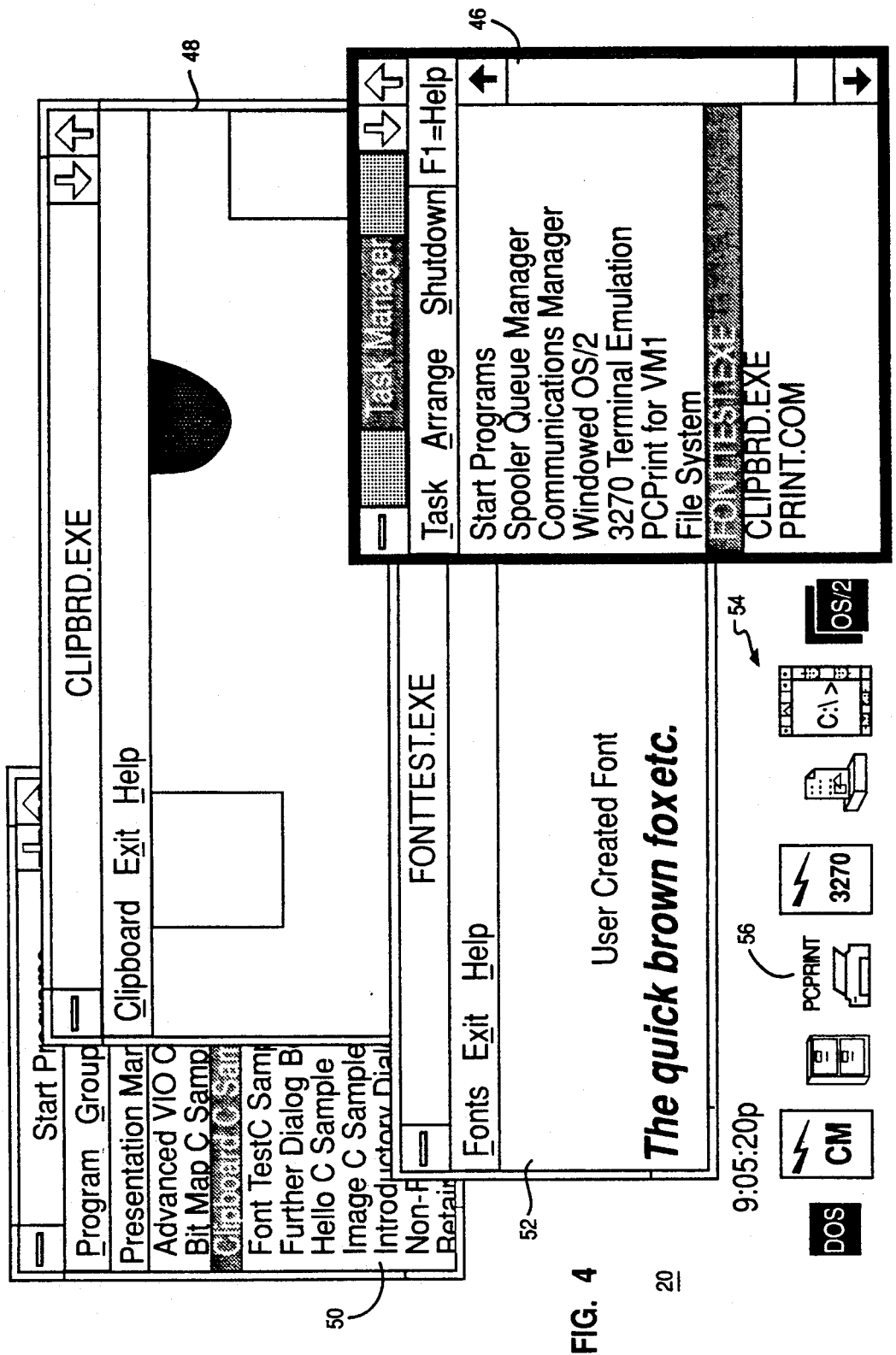
FIG. 4 shows the plurality of windows of FIG. 3 whereby one of the windows has been minimized.

Referring to FIG. 4, there are shown windows 46, 48, 50, and 52 of FIG. 3 and an additional icon 56 which represents the minimized application window 44. As is shown in FIG. 4, subsequent to the minimizing of application window 44, application window 46 becomes the primary or active window.

Figures 5, 6:
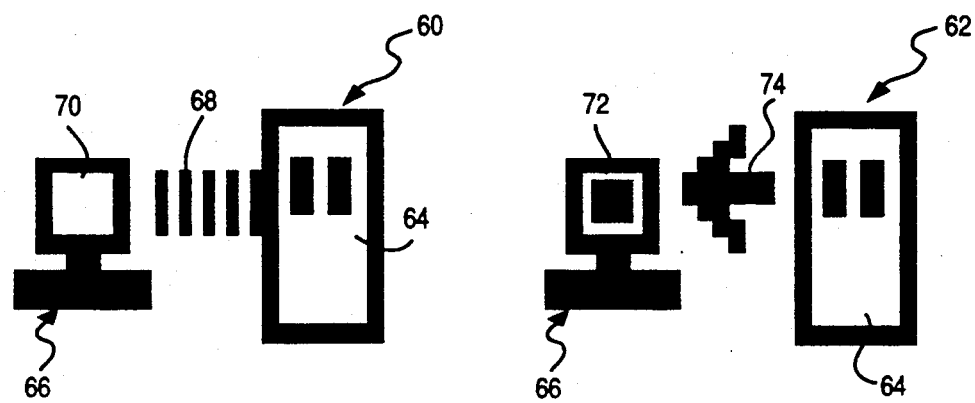
FIG. 5 show a no-update icon associated with a selected application program being executed on the system of FIG. 1.
FIG. 6 illustrates an update icon which is associated with the selected application program.

In the preferred embodiment of the present invention, each application program is assigned to two icons. For purposes of illustration and not limitation, shown in FIGS. 5 and 6 are enlarged versions of a no-update icon 60 and an update icon 62, respectively. The no-update icon 60 represents a host computer system 64 coupled to a terminal 66 by a communication link 68. The terminal 66 includes a display unit 70. System 10 displays the no-update icon 60 during the execution of a selected application program which is associated therewith. Subsequently, when the application program completes its assigned task or needs the attention of the user, system 10 then displays the update icon 62 on the screen of the display device. As is further shown in FIG. 6, the update icon 62 includes a display unit 72 which is different from the display unit 70 associated with the no-update icon 60. The display unit 72 represents a change in the virtual display buffer which is associated with the selected application program. Additionally, the communication link 74 represents a flow of data or information from the Most computer 64 to a terminal 66. Thus, the user of system 10 can immediately determine whether the selected application program has completed its desired task or needs attention of the user without restoring the application window associated with the selected application program.

Figure 7:
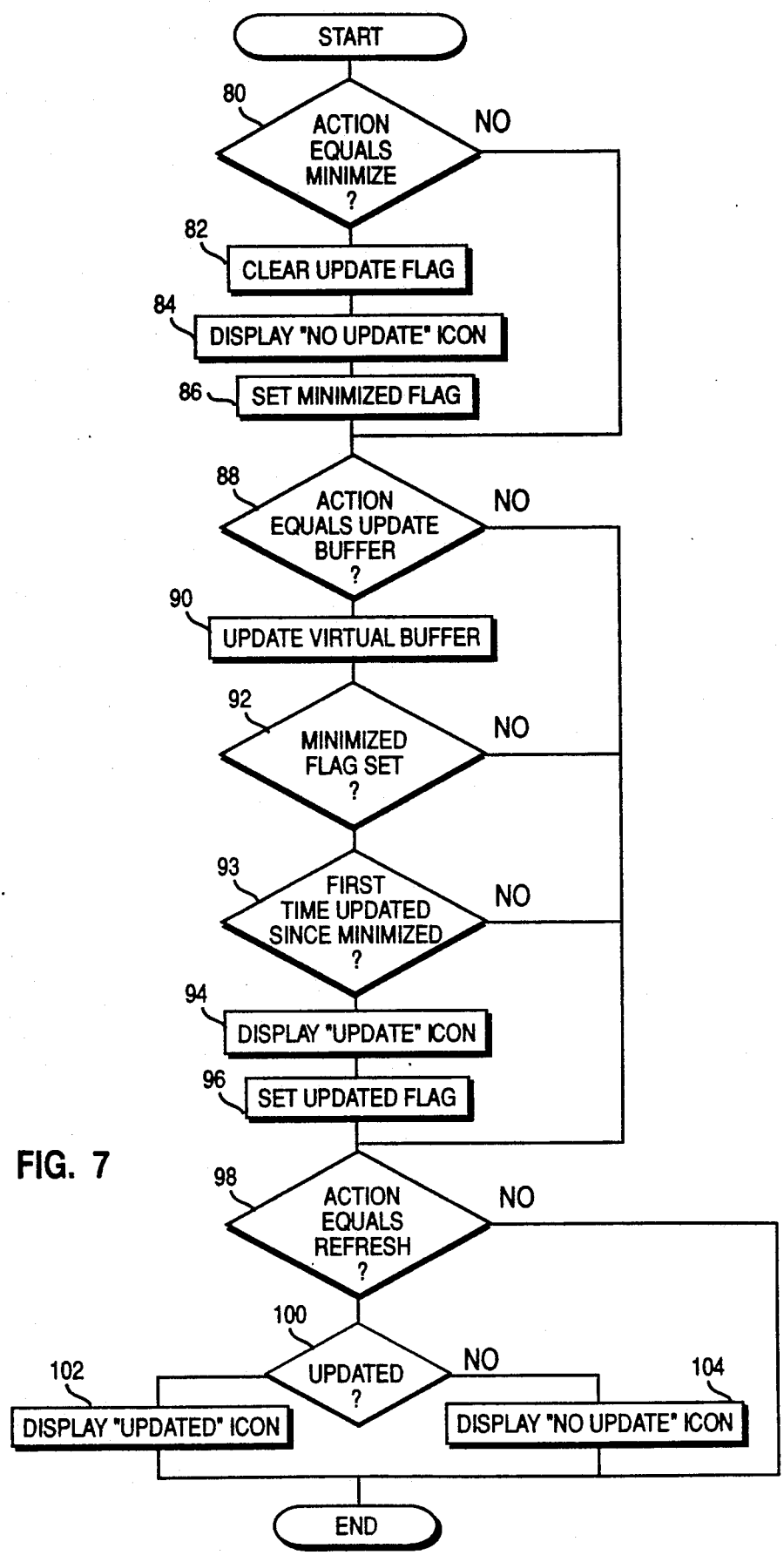
FIGS. 7 through 9 are flow diagrams illustrating the detailed steps of the method of the present invention.

Referring to FIG. 7, there is shown a flow diagram of an icon routine to be included in application programs which are to be monitored on the information processing system 10. In step 80, system 10 determines whether an action to be performed on an application window associated with a selected application program is to minimize the application window. If the application window is to be minimized, steps 82, 84 and 86 clears an update flag, displays the no-update icon and sets a minimized flag, respectively. Step 88 determines whether the action to be performed is to update the virtual buffer associated with the selected application program. As noted above, an update of the virtual display buffer indicates a change of status of the selected application program. The change of status further indicates that the selected application program has completed its assigned task or that the selected application program needs the attention of the user. Step 90 updates the virtual display buffer. Step 92 determines whether the minimized flag is presently set. Step 93 determines whether the update to the virtual display buffer is a first update. If it is determined that the update is the first update steps 94 and 96 facilitates the replacing of the no-update icon with the display of the update icon and sets the update flag, respectively.

Step 98 determines whether the action to be performed is a refresh action. As noted above, an application window may overlay another window or an icon. The refresh action is performed when an icon has been obscured or overlayed by an application window and the window is either moved to a different position on the screen whereby the icon is no longer obscured or overlayed or the window is minimized. Step 100 determines whether the update flag has been set while the icon was obscured or overlayed. Step 102 displays the update icon if the update flag has been set. Step 104 displays a no-update icon if the update flag has not been set.

Figure 8:
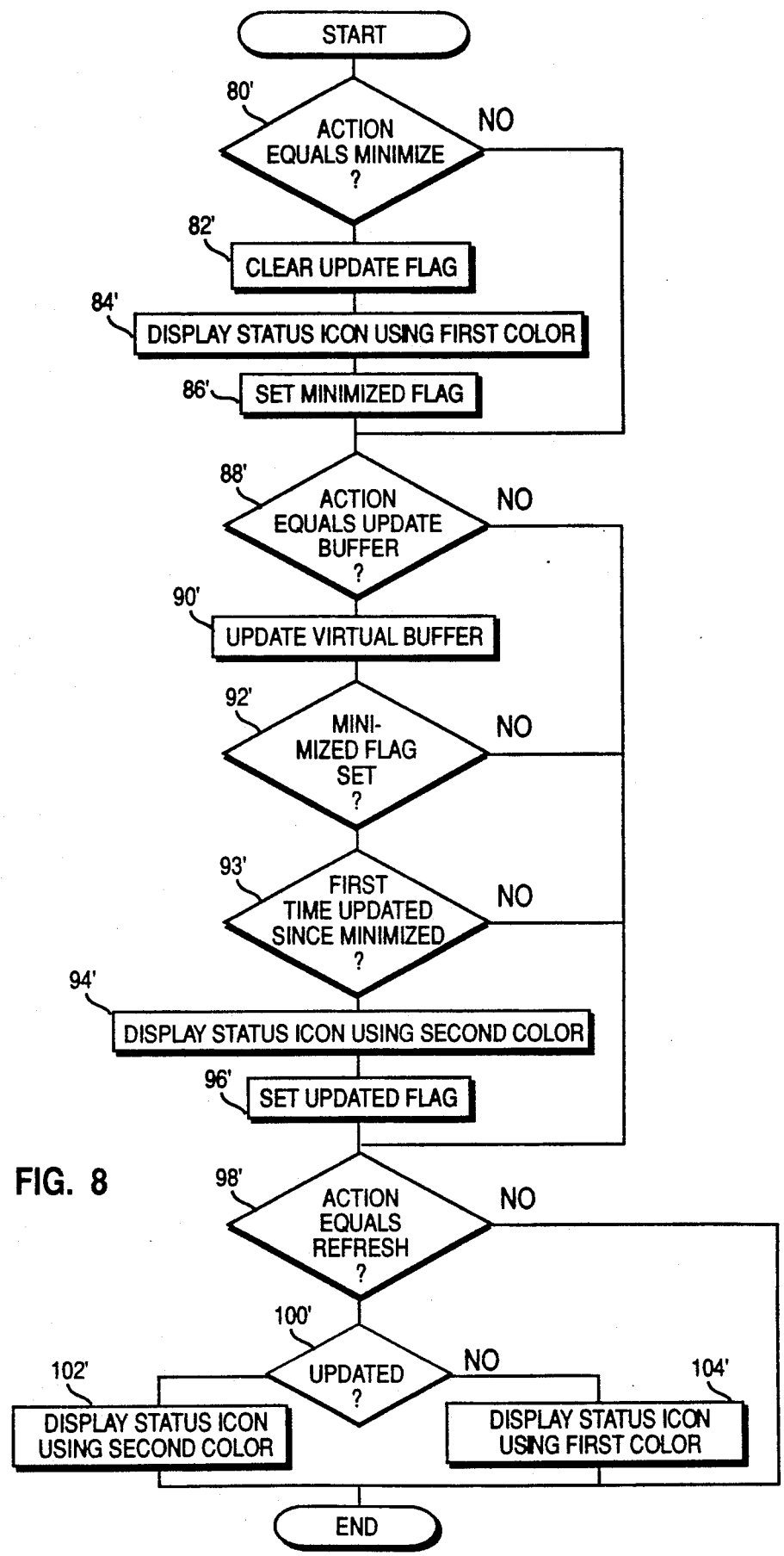

Referring to FIG. 8, there is shown a flow diagram of an alternate embodiment of the icon routine to be included in application programs which are to be monitored on the information processing system 10. As noted above, the preferred embodiment requires the assignment of two icons to each application program. The alternate embodiment only requires the assignment of a single status icon. However, the alternate embodiment utilizes different colors or shades of the status icon to indicate a status change of the application program. The flow diagram shown in FIG. 8 is similar to that shown in FIG. 7, thus, the similar numerals will be used to explain the alternate embodiment. In step 80', system 10 determines whether an action to be performed on an application window associated with a selected application program is to minimize the application window. If the application window is to be minimized, steps 82', 84' and 86' clears an update flag, displays the status icon utilizing a first color or shade and sets a minimized flag, respectively. Step 88' determines whether the action to be performed is to update the virtual buffer associated with the selected application program. As noted above, an update of the virtual display buffer indicates a change of status of the selected application program. The change of status further indicates that the selected application program has completed its assigned task or that the selected application program needs the attention of the user. Step 90' updates the virtual display buffer. Step 92' determines whether the minimized flag is presently set. Step 93' determines whether the update to the virtual display buffer is a first update. If it is determined that the update is the first update steps 94' and 96' facilitates the display of the status icon utilizing a second color or shade and sets the update flag, respectively.

Step 98' determines whether the action to be performed is a refresh action. As noted above, an application window may overlay another window or an icon. The refresh action is performed when an icon has been obscured or overlayed by an application window and the window is either moved to a different position on the screen whereby the icon is no longer obscured or overlayed or the window is minimized. Step 100' determines whether the update flag has been set while the icon was obscured or overlayed. Step 102' displays the status icon utilizing the second color or shade if the update flag has been set. Step 104' displays the status icon utilizing the first color or shade if the update flag has not been set.

Figure 9:
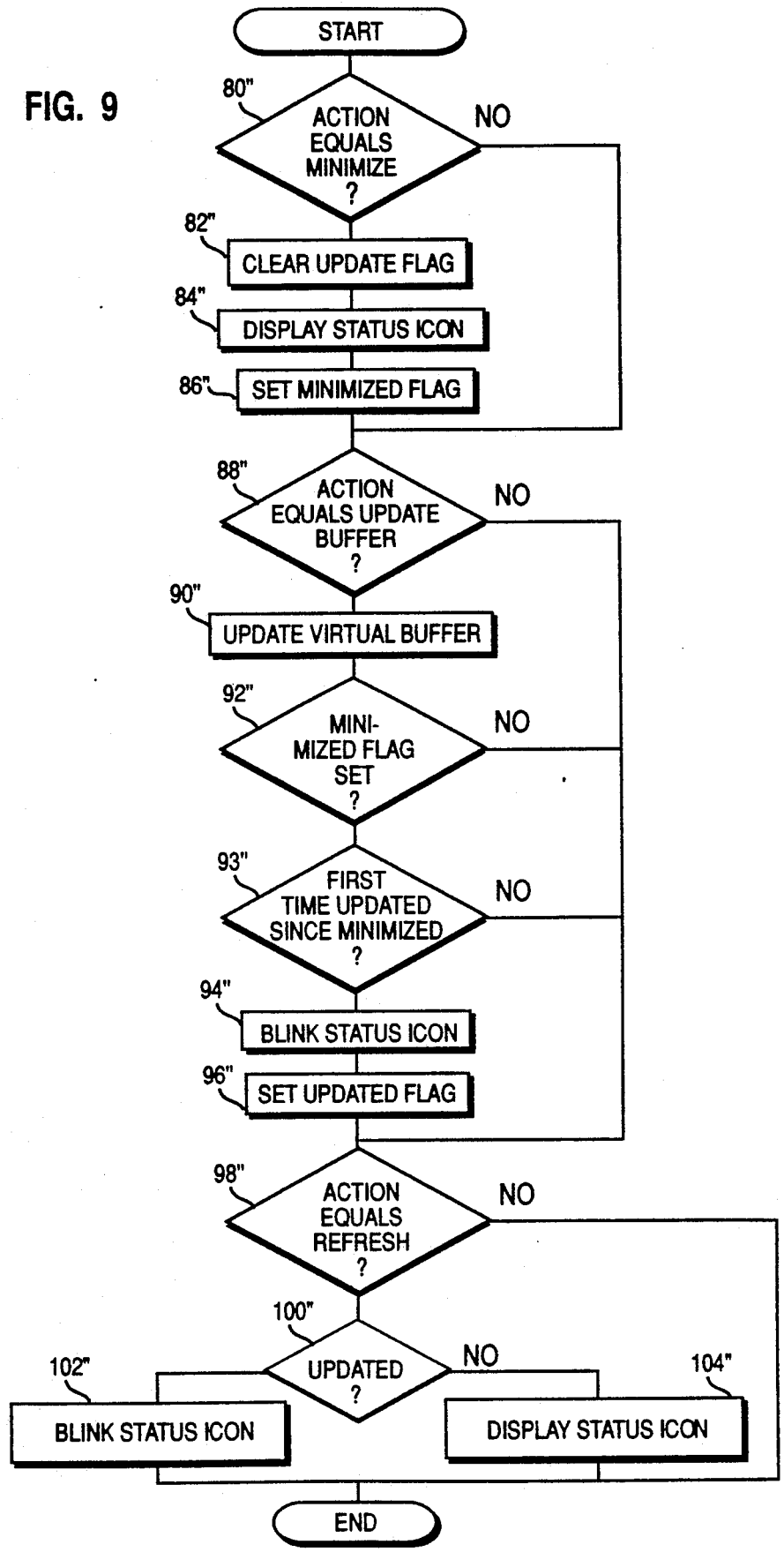

Referring to FIG. 9, there is shown a flow diagram of a second alternate embodiment of the icon routine to be included in application programs which are to be monitored on the information processing system 10. As noted above, the preferred embodiment requires the assignment of two to each application program and the alternate embodiment utilizes multiple colors or shades to indicate a status change. The second alternate embodiment also only requires the assignment of a single status icon. However, the second alternate embodiment utilizes the blinking of the status icon to indicate a status change of the application program. The flow diagram shown in FIG. 9 is similar to that shown in FIG. 7, thus, the similar numerals will be used to explain the alternate embodiment. In step 80'', system 10 determines whether an action to be performed on an application window associated with a selected application program is to minimize the application window. If the application window is to be minimized, steps 82'', 84'' and 86'' clears an update flag, displays a non-blinking status icon, and sets a minimized flag, respectively. Step 88'' determines whether the action to be performed is to update the virtual buffer associated with the selected application program. As noted above, an update of the virtual display buffer indicates a change of status of the selected application program. The change of status further indicates that the selected application program has completed its assigned task or that the selected application program needs the attention of the user. Step 90'' updates the virtual display buffer. Step 92'' determines whether the minimized flag is presently set. Step 93'' determines whether the update to the virtual display buffer is a first update. If it is determined that the update is the first update steps 94'' and 96'' facilitates the blinking of the status icon and sets the update flag, respectively.

Step 98'' determines whether the action to be performed is a refresh action. As noted above, an application window may overlay another window or an icon. The refresh action is performed when an icon has been obscured or overlayed by an application window and the window is either moved to a different position on the screen whereby the icon is no longer obscured or overlayed or the window is minimized. Step 100'' determines whether the update flag has been set while the icon was obscured or overlayed. Step 102'' facilitates the display of the blinking status icon if the update flag has been set. Step 104'' displays the non-blinking status icon if the update flag has not been set.

In operation and referring to FIGS. 2, 3 and 4, for purposes of illustration and not limitation, it is assumed that a user of the system 10 (FIG. 1) has application windows 44 through 52 displayed on the screen of the display device 20. In the preferred embodiment, the user utilizes the mouse 29 to move the cursor to control area 34 associated with the primary window, which is application window 44, and depresses the button on the mouse. This action facilitates the minimization of the application window 44 and the display of a no-update icon, such as icon 56. As noted above, the no-update icon remains displayed on the screen of the display unit until the application program associated therewith completes it assigned task or requires the attention of the user. In response to the completion of the assigned task or the application program requiring the attention of the user, the virtual display buffer associated with the application program is updated. The updating of the virtual display buffer facilitates the display of an update icon. The display of the update icon immediately informs the user of a change of status of the application program associated therewith. In response to the display of the update icon, the user may take the necessary action required for that application program without performing any unnecessary activity in regards to other application programs being executed on system 10.

Figure 10:
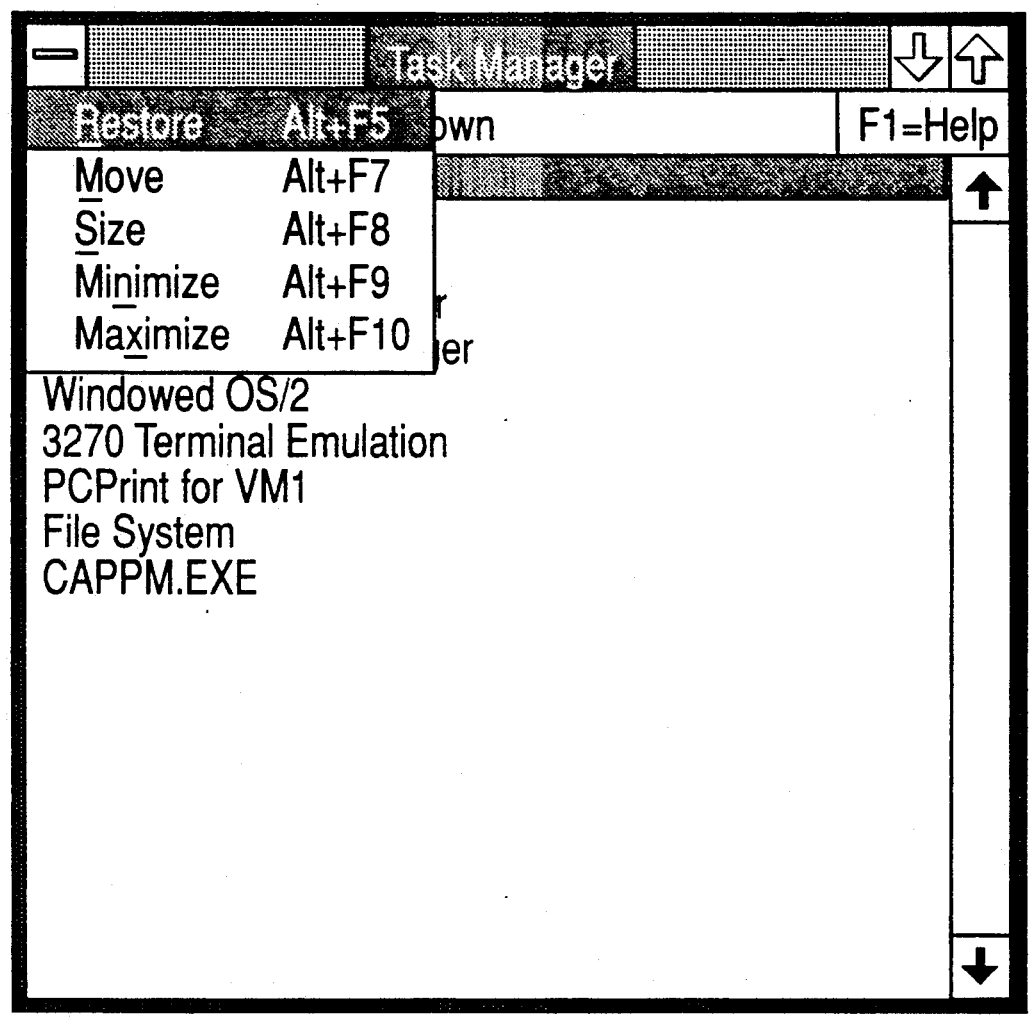
FIG. 10 illustrates an alternate method of minimizing or restoring an application window.

Alternately, the user may use keyboard 22 (FIG. 1) in minimizing the application window 44. In this case, the user moves the cursor within control area 32 and depresses a control key, such as an enter key. System 10, in response to the position of the cursor and the depression of the control key, facilitates the display of a system menu within the application window 44 as shown in FIG. 10. Thereafter, one of a plurality of actions set forth in the menu may be selected by depressing the control keys associated with the selected action. If the minimize action is selected, the application window is replaced by the no-update icon in the same manner as noted above. If the user desires to restore an application window, the cursor is moved coincident with a selected icon and the control keys associated with the restore action are depressed.

While the invention has been particularly shown and described with reference to a preferred embodiment, it will be understood by those skilled in the art that various changes in form and detail may be made without departing from the spirit and scope of the invention.

What is claimed is:

1. In an information processing system, a method of indicating status of an execution of an application program, said execution including a requirement for attention of a user of said application program, comprising:
    displaying, on a display unit of said system, a first icon associated with said application program;
    determining whether a virtual display buffer associated with said application program has been updated to indicate said requirement for said attention of said user; and
    displaying, on said display unit and in response to an updating of said virtual buffer, a second icon having a combination of pictorial elements different from said first icon to indicate said requirement for said attention of said user of said application program.

2. The method of claim 1 further comprising:
    removing an application window associated with said application program prior to said step of displaying said first icon.

3. In an information processing system, a method of indicating status of an execution of one of a plurality of application programs being executed on said system, said execution including a requirement for attention of a user of a first of said application programs, comprising:
    displaying, on a display unit of said system, a first icon associated with said first of said plurality of application programs;
    determining whether a virtual display buffer associated with said first application program has been updated to indicate said requirement for said attention of said user of said first application program; and
    displaying, on said display unit and in response to said virtual buffer's being updated, a second icon having a combination of pictorial elements different from said first icon to indicate said requirement for said attention of said user of said first application program.

4. A system for indicating status of an execution of an application program on an information processing system, said execution including a requirement for attention of a user of said application program, comprising:
    means for displaying, on a display unit of said system, a first icon associated with said application program; and
    means for determining whether a virtual display buffer associated with said application program has been updated to indicate said requirement for said attention of said user; and
    means for displaying, on said display unit and in response to an updating of said virtual buffer, a second icon having a combination of pictorial elements different from said first icon to indicate said requirement for said attention of said user of said application program.

5. The system of claim 4 further comprising:
    means for removing an application window associated with said application program prior to operation of said means for displaying said first icon.

6. A system for indicating status of an execution of one of a plurality of application programs on an information processing system, said execution including a requirement for attention of a user of a first of said application programs, comprising:
    means for displaying, on a display unit of said system, a first icon associated with a first of said plurality of application programs;
    means for determining whether a virtual display buffer associated with said first application program has been updated to indicate said requirement for said attention of said user of said first application program; and
    means for displaying, on said display unit and in response to an updating of said virtual buffer, a second icon having a combination of pictorial elements different from said first icon to indicate said requirement for said attention of said user of said first application program.

* * * * *